Dec. 23, 1941. N. TRBOJEVICH 2,266,923
SCREW AND NUT MECHANISM FOR STEERING GEARS
Filed Feb. 6, 1941
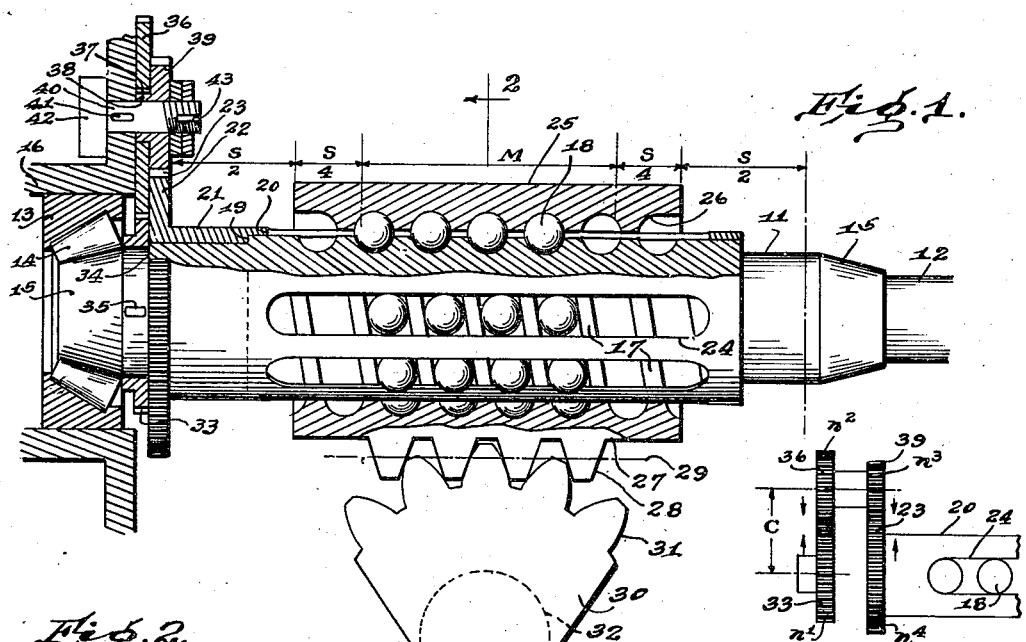
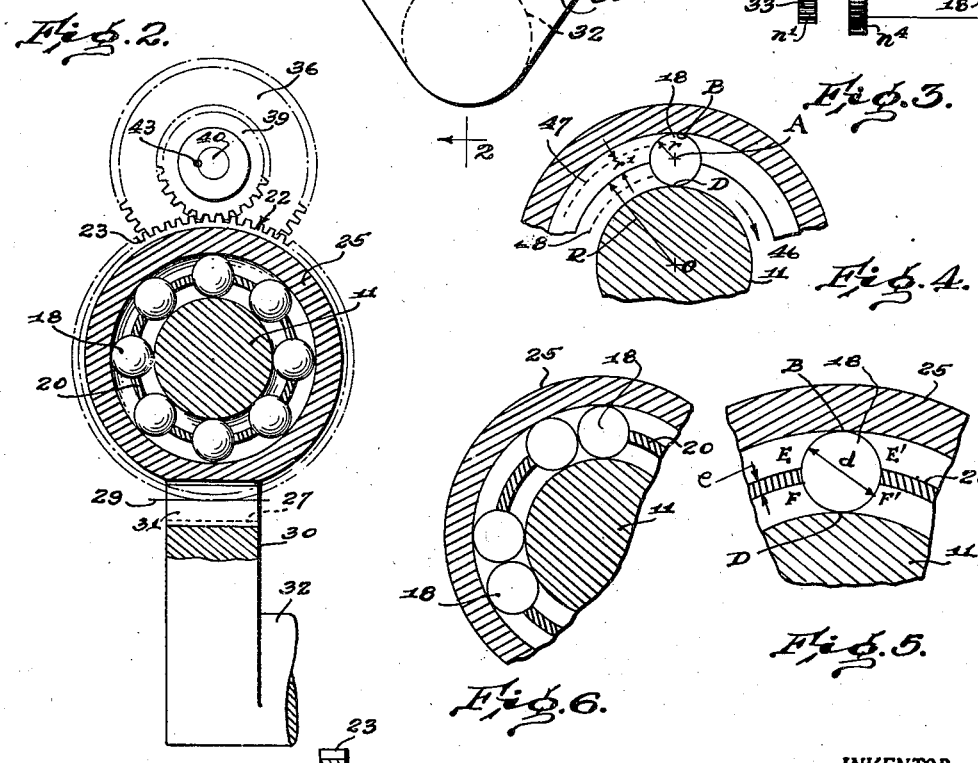
INVENTOR.
Nikola Trbojevich Patented Dec. 23, 1941

2,266,923

UNITED STATES PATENT OFFICE 2,266,923

SCREW AND NUT MECHANISM FOR STEERING GEARS

Nikola Trbojevich, Toledo, Ohio

Application February 6, 1941, Serial No. 377,624

8 Claims. (Cl. 74—499)

The invention relates to a screw and nut mechanism of the so-called "ball nut" type, which is particularly adapted to actuating the steering link systems of vehicles and for other similar purposes.

The principle upon which this invention is based is the one previously described in my prior U. S. Patents Numbers 2,214,492 and 2,214,493, both of September 10, 1940. According to that principle the balls are held in an intervening sleeve member which guides the balls in their rolling motion in a helix to and from, and at the same time prevents them from falling out of the nut. This is in contradistinction to the prior practice as applied in the construction of this type of mechanism in which certain perforations in the body of the nut and certain back channels serving for the return of the balls, were used.

The novelty of this invention resides in my discovery of a geometrical relationship whereby it is now possible to design the sleeve member so that it does not translate together with the balls as described in my two prior patents, but it merely rotates in a timed relation with the screw. I further discovered a type of timing gear train which transmits the timed rotation from the screw to the sleeve effectively and yet it occupies very little room in doing so.

The object is to produce a mechanism of the indicated type possessing a high degree of mechanical efficiency and reliability.

Another object is to simplify the manufacture of the nut.

Another object is to reduce and limit the number of the balls employed only to those which do useful work.

A further object is to guard against the slipping of the balls by controlling their motion individually and collectively by means of a special timing device, at every instant.

In the drawing:

Figure 1 is the main longitudinal section of the new mechanism as applied to actuating a steering sector.

Figure 2 is the cross section taken in the plane 2—2 of Figure 1.

Figures 3 and 4 are geometrical diagrams used in deducing the Equations 1 to 7 inclusive, found in the description.

Figure 5 is a fragmentary view showing the effect of the sleeve thickness upon the useful contact of the ball.

Figure 6 is a modified design of the slots formed in the sleeve.

Figure 7 is a modified design of the main sleeve bearing.

As shown in Figures 1 and 2, the steering worm 11 is rotatable by means of the shaft 12 (which may be connected to the steering wheel of the vehicle) in two taper roller bearings 13, each containing a plurality of taper rollers 14 and an inner cone 15, the latter being made integral with the worm 11. Both of the bearings are co-axially mounted in a steering gear housing 16, and one of the bearings is usually longitudinally slidable in the housing in order to provide for the adjustment.

The worm 11 is provided with a helix 17 at its outer circumference, the said helix having a hollow semi-circular cross contour of a curvature exactly corresponding to that of the balls 18 employed and is usually a "single thread." The worm is further provided with an abutting shoulder 19 near its left end, the purpose being to hold a sleeve 20 in its predetermined longitudinal position relative to the worm. The sleeve 20 is of about the same length as the threaded portion of the worm 11 and is provided at its left end with a thick walled cylindrical portion 21, the said portion forming a bearing concentric with the said worm, abutting the worm shoulder 19 and terminating in a flange 22 upon the circumference of which gear teeth 23 are cut. The right hand portion of the sleeve is a thin walled cylinder enveloping the worm and is provided with a plurality of longitudinal slots 24 in which the balls 18 are rotatable and also longitudinally slidable.

The nut 25 is provided with an internally cut helix 26 of a semi-circular cross contour exactly corresponding in its hand, lead and pitch diameter to the above mentioned helix 17 of the worm. Integrally with the nut 25, a rack 27 having several equispaced teeth 28 is formed having a pitch line 29 strictly parallel to the axes of the nut and screw.

Meshing with the rack 27 is a sector 30 having a plurality of teeth 31 of the same pitch and pressure angle as the rack teeth 28. The number of teeth in the sector is determined by the ratio of the steering gear, said ratio being proportional to the quotient formed by the number of teeth in the sector completed into a full circle divided by the number of threads in the worm 11. The sector 30 is rotatable about a sector shaft 32 integrally formed therewith, the said shaft having an axis disposed at right angles to the axis of the said worm 11.

The timing mechanism will now be described. After the sleeve 20 has been placed upon the worm 11, it is rotatably secured in that position by means of the driving gear 33 which abuts against the worm shoulder 34 and is securely fastened to the worm 11 by means of the key 35, thus preventing the said sleeve from moving to the left. In mesh with the said driving gear 33 is a first back gear 36, which is secured by means such as the key 37 upon the protruding sleeve 38 integrally formed with a second back gear 39, The latter gear is in mesh with the sleeve flange gear 23, already described. The two back gears 36 and 39 respectively, are rotatably mounted as a unit upon a journal 40, the said journal being securely keyed by means of the key 41 in the hole formed in the housing 16 and held in the required accurate position there by means of the button 42. The other end of the journal 40 is threaded and provided with a key 43. A washer 44 and a nut 45 placed upon the end of the said journal 40 permit the two back gears 36 and 39 to rotate freely, but prevent them from moving sidewise. It is important to note that the object of the timing mechanism is to rotate the sleeve 20 in timed relation with the rotation of the worm 11 (whatever that rotation may be) and always in the same direction as the worm. The exact ratio of the gearing 33, 36, 39 and 23 is determined by calculation as it will be presently shown.

Having thus described the mechanism in its preferred modification, I shall now briefly discuss, in the order named, the method of assembling the parts, the method of operation, the calculation of the timing gear ratio, and certain points relevant to the efficiency of design in this type of steering gear.

In assembling the parts, the sleeve 20 is first placed upon the worm 11 and secured in that position by mounting the gear 33. The nut 25 is then placed over the worm from the right side, Figure 1, and the balls are inserted, one after the other, in the recesses formed by the successive intersections of the sleeve slots 24 and the worm thread 17 in the area M and the nut is gradually screwed home over the balls. It is to be noted that when assembled, the nut is filled with balls only partially, in the middle region M, while the two adjoining regions, each approximately S/4 inches wide (where S denotes the length of the stroke), are empty and act as two reservoirs for receiving the overflow of the balls at the end of each stroke. A simple test is available to detect any balls in the nut which are superfluous. For that purpose I rotate the screw to the right and to the left to the limit of the stroke S, and if there be any such balls they will fall out from their recesses at the end of the stroke.

The assembly is completed by mounting the worm and nut unit in the housing in its bearings and by mounting the timing gears and the sector 30.

Regarding the method of operation, it is to be noted that (1) the worm 11 rotates but does not translate; (2) the sleeve 20 rotates in unison with the worm at about one-half of the latter's angular velocity and in the same direction; (3) the nut 25 translates, but does not rotate, being prevented from doing so by the engaging teeth of the rack 27 and the sector 30; (4) the balls 18 translate in a helix. The last named motion is of a particular interest. It is a differential or epicyclic motion of a string of balls in a helix, consisting of a simultaneous rotation and a translation. The rotation of the string follows and lags behind, that of the screw, and its translation follows and lags behind, that of the nut. My invention resides in recognizing and numerically determining these two components and in arriving at the conclusion that I can safely disregard the second component (the translation) providing, however, that I provide one or more longitudinal slots in the sleeve 20 of a length exceeding that of the string of balls located there- in, and in causing the balls to relatively slide in those slots. The improvement in design is obvious and readily seen when the Figure 1 of this application is compared with the Figure 1 of my prior Patent No. 2,214,493. The differential thread 19 at the left side of the said figure is absent in the new construction, which fact enormously simplifies the design.

Thus in action, when the nut 25 translates e. g. to the left, Figure 1, through a distance S/2, all the balls move to the right relatively of the nut, and vice versa. It is seen that the length of the stroke of which this mechanism is capable depends upon the width of the two ball reservoirs S/4 but is independent of the width of the zone M. The zone M is determined solely with the view upon the load carrying capacity of the device which in turn, depends upon the total number of the balls employed, among other factors.

The numerical determination of the gear ratio Q will now be deduced. Let the numbers of teeth in the timing gears 33, 36, 39 and 23 be, in the same order, denoted with $n_1$, $n_2$, $n_3$ and $n_4$, then:

$$Q = \frac{n_1}{n_2} \times \frac{n_3}{n_4} \qquad (1)$$

and, from Figure 3, $$n_1 + n_2 = n_3 + n_4 = C \qquad (2)$$

From Figure 4, let now the nut 25 be stationary and the worm 11 rotate in the direction of the arrow 46. The ball 18 will now roll, presumably without slipping, at the two momentary points of contact B and D. Then, for each one revolution of the worm 11, the arm OA will turn according to the laws of the epicyclic gearing:

$$Q = \frac{OD}{OB + OD} \qquad (3)$$

times. But, $$OD = R - r \qquad (4)$$

and $$OB = R + r \qquad (5)$$

where R is the pitch radius of the worm and r is the radius of the ball 18. Hence, $$Q = \frac{R - r}{2R} = \frac{Q_0 - 1}{2Q_0} \qquad (6)$$

where $$Q_0 = \frac{R}{r} \qquad (7) \quad Q.\ E.\ D.$$

Thus, the timing gear ratio Q is a function of $Q_0$ only, which fact is of some commercial importance in that it shows that the same gear ratio (and the same timing mechanism) will accommodate a wide variety of steering gears having widely varying characteristics as applied to the helix angle, length, diameter, steering ratio, etc., providing, however, that in each case the quotient $Q_0$ is kept constant. Thus, for instance, if the balls are 5/16" diameter and worm has an 1¼" pitch diameter, the quotient $Q_0$ is equal to 4 and the ratio Q is equal to 3/8. Any other steering gear having the same proportion existing between its ball and worm diameters will possess the same timing ratio and may utilize the same timing gear train.

The rolling of a ball in a helical groove without slipping was analyzed to some length in my prior Patent No. 2,214,493. The gist of the analysis is that if the load upon the ball 18, Fig. 4 hereof, is not perpendicular to the worm axis O, but forms an angle with the same, the two helixes along which the ball will roll in such a case will be the helixes 47 and 48 situated at a distance $r'$ (which is less than the radius $r$ of the ball) from the pitch cylinder A. In such a case the new distance $r'$ is determined experimentally or by calculation, and its numerical value thus found is used in lieu of $r$ in the Equations 1 to 7 inclusive in obtaining the timing ratio Q.

In Figure 5, the advantage of selecting the wall thickness $e$ of the sleeve 20 as small as possible relative to the diameter of the ball is diagrammatically shown. It is desirable to have the line of contact of the ball 18 with the two races as long as possible. The total length of contact is:

$$EBE' + FDF' = d\pi - 2e \qquad (8)$$

It will be found by means of a simple calculation that for a $\frac{1}{16}''$ diameter of ball and for $e = .040''$, the thickness of wall of the sleeve, the ball will have a useful contact with the two races amounting to approximately 92 per cent of its circumference, which shows that this method of holding the balls in the races provides a sufficient length of contact for all practical purposes.

In Figure 6, another method of forming the slots 24 (see Figures 1 and 2) of the sleeve 20 is shown. Ordinarily, there are as many slots in the sleeve as there are balls in the circle as measured in a plane perpendicular to the sleeve axis. However, it is permissible from a theoretical standpoint to place two or more balls in each slot, thus reducing the number of slots and increasing the torsional resistance of the sleeve.

In Figure 7, a modification of the method of mounting the sleeve 20 upon the worm 11 is fragmentarily shown. In this case a plurality of needle rollers 49 are interposed between the sleeve and the worm next to the flange 22 of the sleeve. By this means the amount of friction between the worm and the sleeve is reduced and the all around mechanical efficiency of the mechanism is increased.

What I claim as new is:

1. A screw and nut mechanism comprising a rotatable screw having a helix, a plurality of balls in the said helix, a sleeve member having longitudinal slots straddling the said balls and coaxially rotatable about the said screw, a nut having a cooperating helix enveloping the said balls, a gear affixed to the screw, another gear affixed to the sleeve and an intermediary toothed member meshing with the aforesaid two gears in such a manner that the said screw and sleeve are rotatable in the same direction, but at differing angular velocities and at a predetermined ratio of transmission.

2. A screw and nut mechanism comprising a rotatable screw having a helix, a plurality of balls in the said helix, a bearing surface in the said screw, a slotted sleeve member coaxial with the screw and straddling the balls, a bearing surface in the said sleeve engaging the said bearing of the screw, a nut having a helix and enveloping the said balls at their outer circumference and a connective train composed of gears connecting with its one end the screw and with its other end the sleeve in a predetermined timed relation whereby the rotation of the screw is transmitted to the said sleeve at every instant.

3. A steering gear for vehicles comprising a rotatable steering screw having a helix, a plurality of balls in the said helix, a slotted sleeve coaxial with the screw, rotatable but not translatable thereupon and enveloping the balls at their midportion in the helix, a nut having a helix and enveloping the said balls at their outer circumference, a train of intermeshing gears transmitting the rotation from the screw to the sleeve in a timed relation, a transverse steering shaft having an axis of rotation substantially at right angles to the said screw and nut and connective means connecting the said transverse shaft to the nut in such a manner that the said nut may translate longitudinally of the said screw, but is prevented from rotating thereabout.

4. A power transmitting device comprising in combination, a rotatable screw, a coaxial nut, a plurality of balls interposed between the said members, a tubular sleeve member rotatable about the screw and contacting and segregating the said balls in a plurality of longitudinally disposed rows, a gear affixed to each the said screw and the sleeve, and an idler gear member connecting the said two gears whereby the said screw and sleeve are rotatable in the same direction but at different rates of angular velocity in a predetermined timed relation.

5. A screw and nut mechanism comprising a rotatable screw having a helix, a plurality of balls in the said helix, a sleeve member having longitudinal slots straddling said balls in the helix and coaxially rotatable about said screw, a nut having a cooperating helix enveloping said balls, gearing between said screw and said sleeve to rotate said sleeve in the direction of rotation of said screw at a predetermined ratio of transmission at different angular velocity, and means to rotate said screw.

6. A screw and nut mechanism comprising a rotatable screw having a helix, a plurality of balls in the said helix, a bearing surface on said screw, a slotted sleeve member coaxial with said screw and straddling said balls, a bearing surface in said sleeve engaging said bearing of the screw, a nut having a cooperating helix enveloping the said balls, and a gear train interconnecting said screw and said sleeve for imparting the rotation of said screw to said sleeve in a predetermined timed relation.

7. A steering gear for vehicles comprising a rotatable steering screw having a helix, a plurality of balls in said helix, a slotted sleeve coaxial with said screw, rotatable but not translatable thereupon and engaging the balls at their midportion in the helix, a nut having a helix and enveloping the said balls at their outer circumference, a train of intermeshing gears for transmitting rotation of said screw to said sleeve in timed relation, a transverse steering shaft having an axis of rotation substantially at right angles to said screw and nut, and a geared connection between said transverse shaft and said nut, arranged so that said nut may translate longitudinally of the screw.

8. A power transmitting device comprising in combination a rotatable screw, a coaxial nut, a plurality of balls interposed between said screw and said nut, a tubular sleeve member rotatable about the screw in contact with and segregating said balls in a plurality of longitudinally disposed rows, and means for rotating said screw and the sleeve in the same direction at different rates of angular velocity.

NIKOLA TRBOJEVICH.